United States Patent
Lee et al.

(10) Patent No.: US 9,691,336 B2
(45) Date of Patent: Jun. 27, 2017

(54) FLAT DISPLAY DEVICE AND METHOD OF FABRICATING THE SAME

(71) Applicant: LG Display Co., Ltd., Seoul (KR)

(72) Inventors: Sang-Hyup Lee, Gumi-si (KR); Jeong-Hoon Jang, Busan (KR)

(73) Assignee: LG Display Co., Ltd., Seoul (KR)

( * ) Notice: Subject to any disclaimer, the term of this patent is extended or adjusted under 35 U.S.C. 154(b) by 540 days.

(21) Appl. No.: 13/860,335

(22) Filed: Apr. 10, 2013

(65) Prior Publication Data
US 2014/0111504 A1 Apr. 24, 2014

(30) Foreign Application Priority Data
Oct. 23, 2012 (KR) .................. 10-2012-0117987

(51) Int. Cl.
*G09G 3/36* (2006.01)
*G02F 1/1343* (2006.01)
*G02F 1/1362* (2006.01)

(52) U.S. Cl.
CPC ..... *G09G 3/3607* (2013.01); *G02F 1/134363* (2013.01); *G02F 1/136259* (2013.01); *G02F 2001/134372* (2013.01); *G02F 2001/136268* (2013.01)

(58) Field of Classification Search
CPC .. G09G 3/3648; G09G 2330/10; G09G 3/006; G09G 3/3614
USPC .................................................. 345/92, 204
See application file for complete search history.

(56) References Cited

U.S. PATENT DOCUMENTS

| | | | |
|---|---|---|---|
| 2006/0145157 A1 | 7/2006 | Choi et al. | |
| 2007/0126460 A1* | 6/2007 | Chung | G09G 3/3648 345/98 |
| 2009/0185091 A1* | 7/2009 | Kim | C09K 19/02 349/39 |
| 2009/0268119 A1* | 10/2009 | Lee | G02F 1/136259 349/54 |
| 2009/0290081 A1* | 11/2009 | Cho | G02F 1/136286 349/42 |
| 2012/0187405 A1* | 7/2012 | Imamura | G02F 1/134363 257/59 |
| 2012/0280237 A1* | 11/2012 | Kwack | H01L 27/1288 257/59 |

FOREIGN PATENT DOCUMENTS

| | | |
|---|---|---|
| CN | 1420554 A | 5/2003 |
| CN | 101174068 A | 5/2008 |
| CN | 101441370 A | 5/2009 |
| CN | 101566770 A | 10/2009 |
| CN | 101587270 A | 11/2009 |

OTHER PUBLICATIONS

Office Action for Chinese Patent Application No. CN 201310165862.5, Oct. 28, 2015, 24 Pages.

* cited by examiner

*Primary Examiner* — Jose Soto Lopez
(74) *Attorney, Agent, or Firm* — Fenwick & West LLP

(57) ABSTRACT

Disclosed are a flat panel display and a method for fabricating the same to connect defective sub-pixels to normal sub-pixels adjacent thereto, drive defective sub-pixels using thin film transistors of the normal sub-pixels and thereby repair the defective sub-pixels.

17 Claims, 15 Drawing Sheets

FLAT DISPLAY DEVICE AND METHOD OF FABRICATING THE SAME

CROSS-REFERENCE TO RELATED APPLICATIONS

This application claims the benefit of Korean Patent Application No. 10-2012-0117987, filed on Oct. 23, 2012, which is hereby incorporated by reference as if fully set forth herein.

BACKGROUND

Field of Technology

The present invention relates to a flat panel display. More specifically, the present invention relates to a flat panel display and a method for fabricating the same to simply repair defective sub-pixels using normal sub-pixels.

Discussion of the Related Art

With the progress of information-dependent society, the demand for various forms of display devices has increased. To meet such a demand, efforts have recently been made to research various types of flat panel displays such as liquid crystal displays (LCDs), plasma display panels (PDPs), electro-luminescent displays (ELDs), and vacuum fluorescent displays (VFDs) and some thereof are utilized as display devices for various equipment.

Such a flat panel display includes a display panel to display an image and performs an inspection process to check whether the display panel functions as desired in order to detect defects. Generally, the inspection process is carried out by applying a predetermined test signal to the display panel and checking for occurrences of defects.

For example, when the flat panel display is a liquid crystal display device, a test signal is applied to gate and data lines of the liquid crystal display device, on/off states of thin film transistors formed in respective sub-pixels are checked and a lightening state of the sub-pixels is checked, when the thin film transistor is in an on state. The defects of sub-pixels may be caused by short-circuit and/or open circuit of signal lines, defects of thin film transistors, defects of electrode patterns and the like.

In addition, the defective sub-pixels exhibit dark or bright points when the liquid crystal display device is driven. For this reason, display characteristics of liquid crystal displays are deteriorated. In particular, a wavelength range which is most easily recognized by the naked eye of humans is about 555 nm which corresponds to a peak wavelength of green light. Accordingly, green (G) sub-pixels rendering green light exhibit superior visibility, as compared to red (R) and blue (B) sub-pixels rendering red light and blue light and display quality of liquid crystal display devices are greatly deteriorated, when G sub-pixels are defective.

SUMMARY

Accordingly, the present invention is directed to a flat panel display and a method for fabricating the same that substantially obviate one or more problems due to limitations and disadvantages of the related art.

An object of the present invention is to provide a flat panel display and a method for fabricating the same to connect defective sub-pixels to normal sub-pixels adjacent thereto, drive defective sub-pixels using thin film transistors of the normal sub-pixels and thereby repair the defective sub-pixels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flat panel display comprises: a display panel including a plurality of sub-pixels defined by intersections of a plurality of gate lines and a plurality of data lines, each sub-pixel including a thin film transistor and a pixel electrode connected to the thin film transistor; and a link pattern connecting a pixel electrode of a defective sub-pixel from the plurality of sub-pixels to a pixel electrode of a sub-pixel that is not defective and is adjacent to the defective sub-pixel.

In another aspect of the present invention, a method for fabricating a flat panel display comprises: forming a display panel comprising a plurality of sub-pixels defined by a plurality of gate lines and a plurality of data lines, wherein each sub-pixel comprises a thin film transistor, a pixel electrode connected to the thin film transistor, and a common electrode overlapping the pixel electrode via an insulating film to form fringe field switching; identifying a defective sub-pixel from among the plurality of sub-pixels; and connecting a pixel electrode of the defective sub-pixel to a pixel electrode of a sub-pixel that is not defective and is adjacent to the defective sub-pixel through a link pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the embodiments of the present invention, examples of which are illustrated in the accompanying drawings. Wherever possible, the same reference numbers will be used throughout the drawings to refer to the same or like parts.

Hereinafter, a flat panel display of the present invention will be described with reference to the annexed drawings.

First Embodiment

Figure 1:
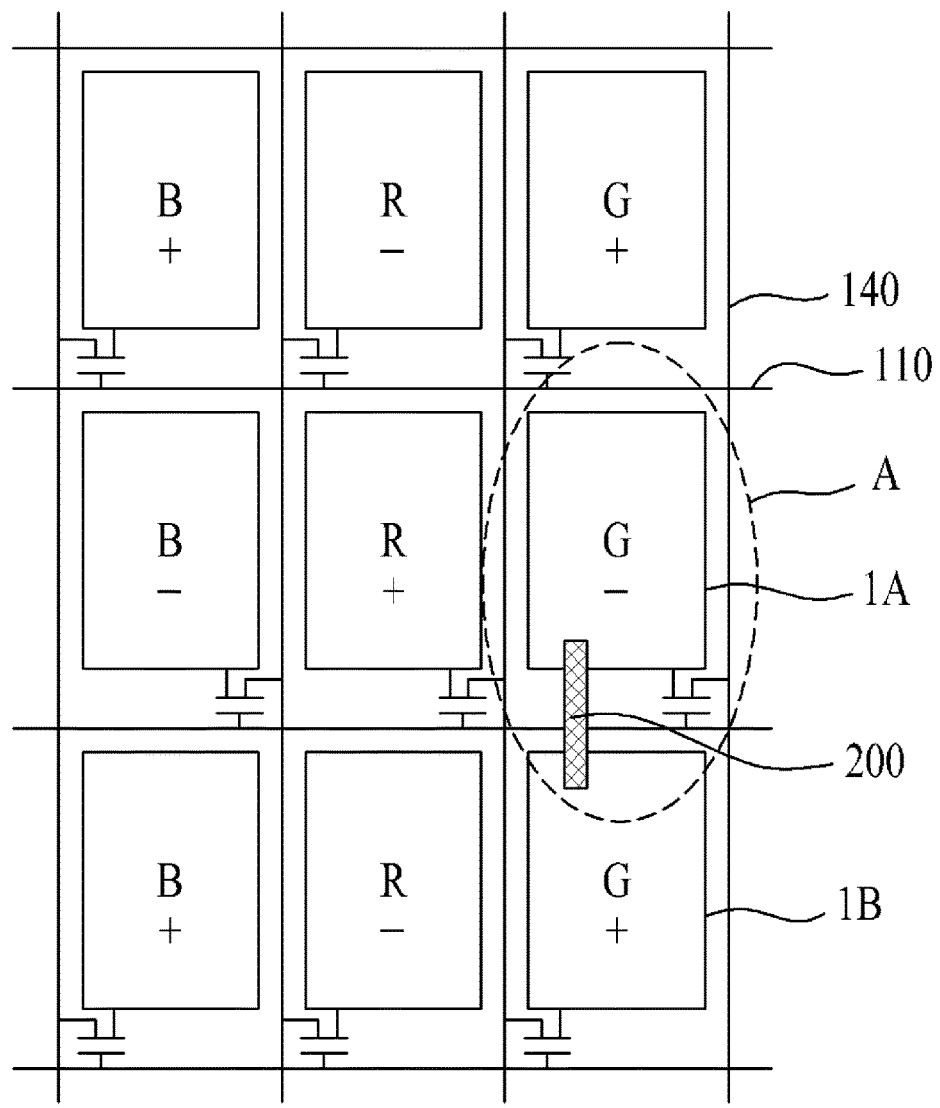
FIG. 1 is a plan view illustrating a flat panel display according to a first embodiment.
Figure 2A:
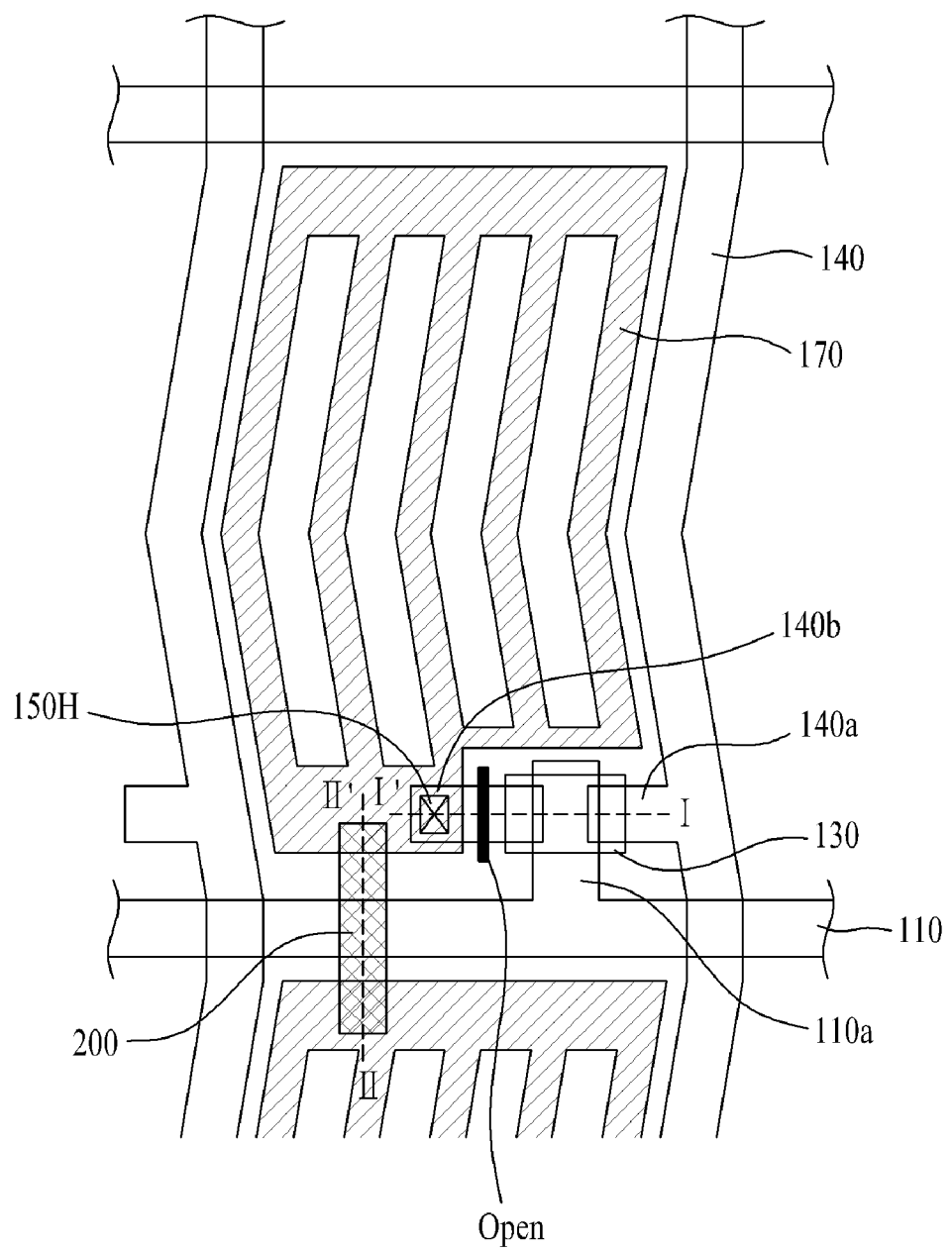
FIG. 2A is an enlarged view of a region A of FIG. 1.
Figure 2B:
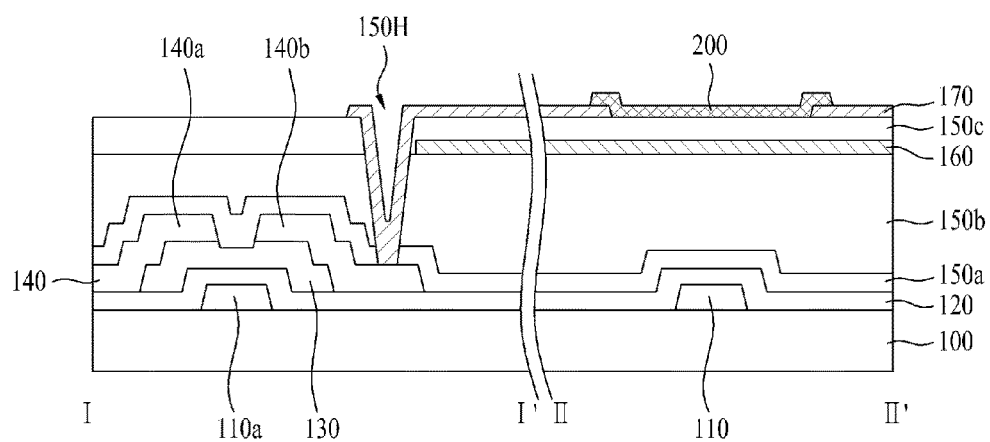
FIG. 2B is a sectional view taken along the lines I-I' and II-II' of FIG. 2A.

FIG. 1 is a plan view illustrating a flat panel display according to a first embodiment. FIG. 2A is an enlarged view of a region A of FIG. 1. FIG. 2B is a sectional view taken along the lines I-I' and II-II' of FIG. 2A.

As shown in FIG. 1, the flat panel display according to the first embodiment of the present invention includes a plurality of sub-pixels arrayed in a matrix form. The flat panel display includes a thin film transistor substrate, a color filter substrate and a liquid crystal layer disposed between the thin film transistor substrate and the color filter substrate. Each sub-pixel is formed in a pixel region defined by each of intersections between a plurality of gate lines 110 and a plurality of data lines 140.

Among the sub-pixels, a defective sub-pixel 1A is connected to a normal sub-pixel 1B adjacent thereto through a link pattern 200. If the defective sub-pixel is not connected to the normal sub-pixel 1B through the link pattern 200, it may exhibit dark or bright points when driven. A defective sub-pixel may be caused by a short-circuit and/or an open circuit of signal lines, defects of thin film transistors, defects of electrode patterns and the like. In contrast, a normal sub-pixel is a sub-pixel that functions correctly (i.e., not defective) by emitting the intended color of light associated with the sub-pixel. When the normal sub-pixel 1B is driven, the defective sub-pixel 1A is also driven due to being connected to the normal sub-pixel 1B through the link pattern 200 and the defective sub-pixel 1A is operable. Accordingly, the defective sub-pixel 1A and the normal sub-pixel 1B preferably emit the same color of light.

As shown in FIGS. 2A and 2B, the thin film transistor substrate includes a lower substrate 100, a thin film transistor formed on the lower substrate 100, a pixel electrode 170 connected to the thin film transistor and a common electrode 160 overlapping the pixel electrode 170 via the insulating film 150c to form fringe field switching (FFS).

Specifically, the gate lines 110 and the data lines 140 intersect each other on the lower substrate 100 to define a plurality of pixel regions. Each pixel region includes a thin film transistor including a gate electrode 110a, a semiconductor layer 130 including an active layer (not shown) and an ohmic contact layer (not shown), a source electrode 140a extending from the data line 140 and a drain electrode 140b spaced from the source electrode 140a. In FIG. 2A, "open" refers to a break (i.e., a cut) in the drain electrode of the defective sub-pixel. The break is created in the defective sub-pixel to prevent the normal sub-pixel connected to the defective sub-pixel via the link pattern 200 from appearing defective during an auto probe test of the panel although the normal sub-pixel is operating correctly.

A first protective film 150a and a second protective film 150b are formed over a gate insulating film 120 in this order such that they cover the thin film transistor, and a common electrode 160 is formed on the second protective film 150b. The common electrode 160 is made of a transparent conductive material such as tin oxide (TO), indium tin oxide (ITO), indium zinc oxide (IZO), or indium tin zinc oxide (ITZO). The common electrode 160 is formed in a single electrode shape over the entire surface of the second protective film 150b in a region excluding the thin film transistor, as shown in only FIG. 2B.

An insulating film 150c is formed such that it covers the common electrode 160, and a drain contact hole 150H is formed by selectively removing a portion of the first protective film 150a located over a portion of the drain electrode 140B, a portion of the second protective film 150b located over the portion of the drain electrode 140b, and a portion of the insulating film 150c to expose the portion of the drain electrode 140b. A slit-shaped pixel electrode 170 is formed on the insulating film 150c, and the pixel electrode 170 is connected through the contact hole 150H to the drain electrode 140b. The common electrode 160 overlaps the pixel electrode 170 via the insulating film 150c to form fringe field switching (FFS).

Although not illustrated, the color filter substrate is joined to the thin film transistor substrate. The color filter substrate includes color filters formed in respective pixel regions of an upper substrate, black matrixes formed in regions provided between respective sub-pixels and regions corresponding to the thin film transistors to prevent light leakage, and an over coat layer covering the entire surface of the upper substrate including the color filters and the black matrixes.

In addition, the liquid crystal layer is disposed between the thin film transistor substrate and the color filter substrate. Liquid crystal molecules of the liquid crystal layer are rotated by fringe field switching. According to a rotational level of liquid crystal molecules, transmittance of light through the pixel region is changed and an image is thus formed.

In the flat panel display of the present invention, the pixel electrode 170 of the defective sub-pixel 1A is connected to the pixel electrode 170 of the normal sub-pixel 1B using the link pattern 200. The normal sub-pixel 1B is disposed upstream or downstream of the defective sub-pixel 1A, and the link pattern 200 overlaps the area above the gate line 110 to connect the pixel electrode 170 of the defective sub-pixel 1A to the pixel electrode 170 of the normal sub-pixel 1B. In this case, the link pattern 200 is made of tungsten (W).

That is, the flat panel display of the present invention described above drives the defective sub-pixel 1A using the thin film transistor of the normal sub-pixel 1B and thereby normally drives the defective sub-pixel 1A. In one embodiment, a drive voltage is applied to the normal sub-pixel 1B thereby driving the normal sub-pixel 1B. Since the defective sub-pixel 1A is connected to the normal sub-pixel 1B via the link pattern 200, the defective sub-pixel 1A is also driven resulting in the emission of light by the defective sub-pixel 1A when the drive voltage is applied to the normal sub-pixel 1B. Accordingly, in the thin film transistor of the defective sub-pixel 1A, a part of the drain electrode 140b is removed in order to block a data signal (not shown). In one embodiment, the part of the drain electrode 140B is removed by cutting the drain electrode 140B. By cutting the drain electrode 140B, the normal sub-pixel 1B that is connected to the defective sub-pixel 1A does not appear defective during an auto probe test of the panel. If the drain electrode 140B is not removed, the normal sub-pixel 1B will appear defective during the auto probe test of the panel.

In particular, the flat panel display according to the first embodiment of the present invention is preferably driven in a Z-inversion mode, in order to secure a sufficient charging time of the thin film transistor, since two sub-pixels are driven by one thin film transistor when the defective sub-pixel 1A is repaired.

In the Z-inversion mode, a plurality of thin film transistors in a plurality of sub-pixels are arranged in a zigzag form. As shown in FIG. 1, the thin film transistors connected to an odd-numbered gate line 110 (i.e., a first side gate line) are respectively connected to left data lines 140 (i.e., a first side data line), and the thin film transistors connected to an even-numbered gate line 110 (i.e., a second side gate line) are respectively connected to right data lines 140 (i.e., a second side data line).

As compared to frame and line inversion modes, the Z-inversion mode has sufficient charging time margin of the thin film transistors. Accordingly, deterioration in display quality of the sub-pixels can be prevented, although two sub-pixels are driven using one thin film transistor.

Further, the sub-pixels of the flat panel display of the present invention are driven in a fringe field switching mode. The flat panel display of the fringe field switching mode has a small sub-pixel size and thus high resolution, as compared to flat panel displays driven in a twisted nematic (TN) mode or an in-plane switching mode. Accordingly, when the normal sub-pixel 1B is driven, although the defective sub-pixel 1A connected to the normal sub-pixel through the link pattern 200 is driven together with the normal sub-pixel 1B, the defective sub-pixel 1A does not appear defective (i.e., the defective sub-pixel 1A emits an intended color of light).

Second Embodiment

The flat panel display according to a second embodiment of the present invention has a configuration in which two normal sub-pixels are connected to a defective sub-pixel and 1.5 sub-pixels are driven using one thin film transistor. 1.5 sub-pixels are driven since each normal sub-pixel connected to the defective sub-pixel 1A drives itself and half of the defective sub-pixel 1A.

By using two normal sub-pixels to drive the defective sub-pixel, the length of time needed to drive the defective sub-pixel is reduced compared to the first embodiment. In one embodiment, a drive voltage is applied to the two normal sub-pixels 1C and 1D that are connected to the defective sub-pixel thereby driving the two normal sub-pixels 1C and 1D. Since the defective sub-pixel 1A is connected to the two normal sub-pixels 1C and 1D via the link patterns 200A and 200B, the defective sub-pixel 1A is also driven resulting in the emission of light by the defective sub-pixel 1A when the drive voltage is applied to the two normal sub-pixels 1C and 1D.

Figure 3:
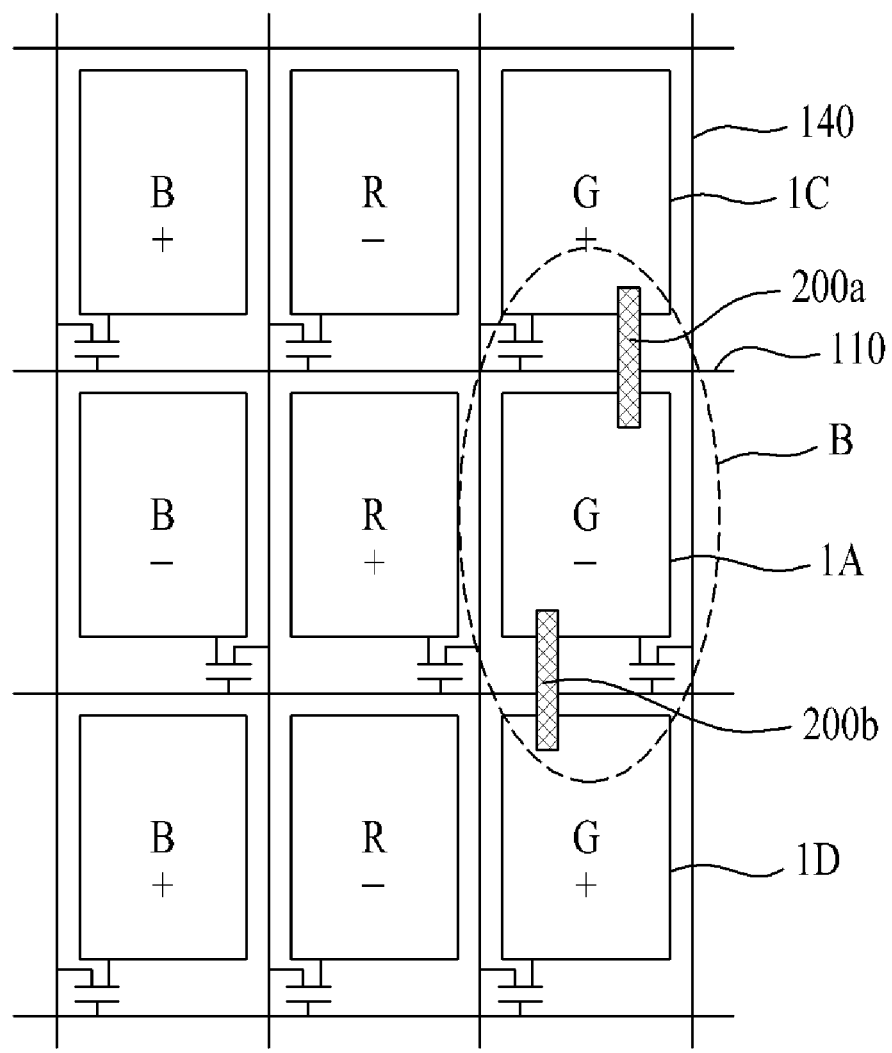
FIG. 3 is a plan view illustrating a flat panel display according to a second embodiment.
Figure 4A:
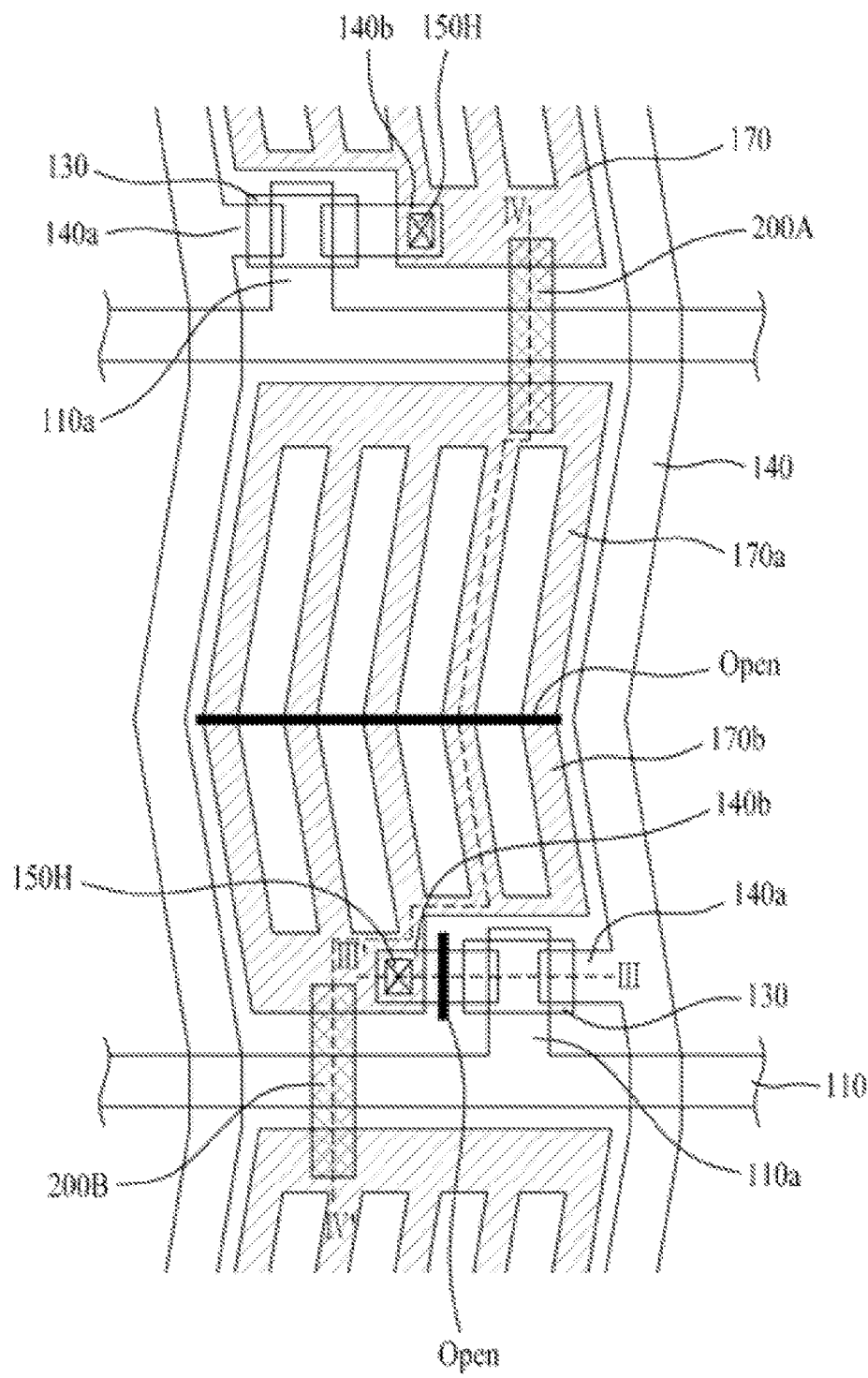
FIG. 4A is an enlarged view of a region B of FIG. 3.
Figure 4B:
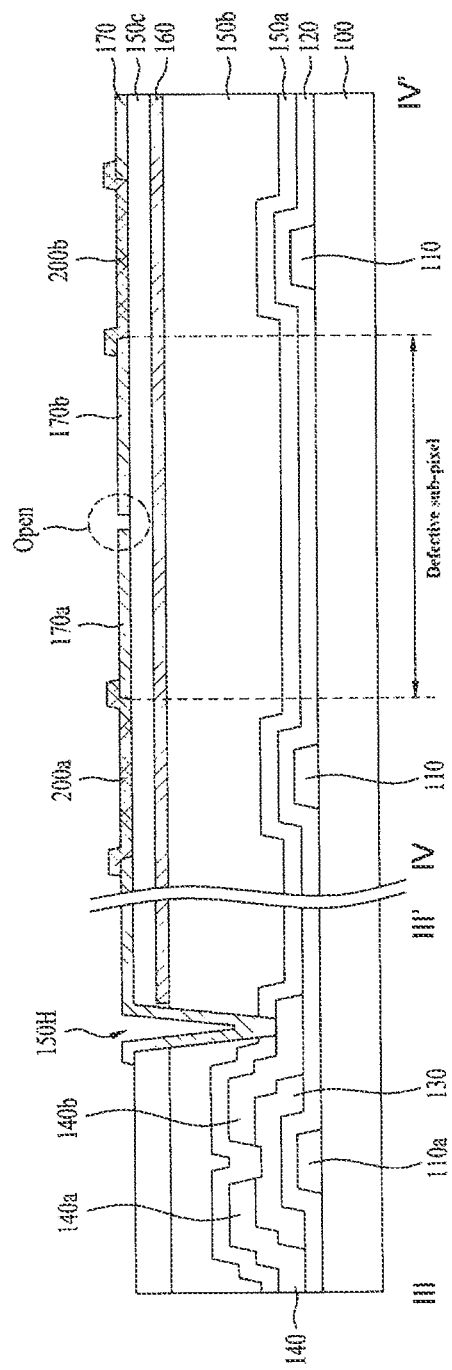
FIG. 4B is a sectional view taken along the lines III-III' and IV-IV' of FIG. 4A.

FIG. 3 is a plan view illustrating a flat panel display according to a second embodiment. FIG. 4A is an enlarged view of a region B of FIG. 3. FIG. 4B is a sectional view taken along the lines III-III' and IV-IV' of FIG. 4A.

As shown in FIG. 3, the flat panel display according to the second embodiment of the present invention includes a plurality of sub-pixels arrayed in a matrix form, and each sub-pixel is formed in a pixel region defined by gate lines 110 and data lines 140 which intersect each other. Among the sub-pixels, the defective sub-pixel 1A is connected to first and second normal sub-pixels 1C and 1D adjacent thereto through first and second link patterns 200a and 200b. In this case, the defective sub-pixel 1A and the normal sub-pixels 1C and 1D emit the same color of light.

As shown in FIGS. 4A and 4B, the thin film transistor substrate includes a lower substrate 100, a thin film transistor formed on the lower substrate 100, a pixel electrode 170, 170a or 170b connected to the thin film transistor and a common electrode 160 overlapping the pixel electrode 170 via the insulating film 150c to form fringe field switching (FFS). The thin film transistor includes a gate electrode 110a, a semiconductor layer 130 including an active layer (not shown) and an ohmic contact layer (not shown), a source electrode 140a extending from the data line 140 and a drain electrode 140b spaced from the source electrode 140a.

A first protective film 150a and a second protective film 150b are formed over the gate insulating film 120 in this order such that they cover the thin film transistor, and a common electrode 160 is formed on the second protective film 150b. In this case, the common electrode 160 is formed in a single electrode shape over the entire surface of the second protective film 150b in a region excluding the thin film transistor.

An insulating film 150c is formed such that it covers the common electrode 160, and a drain contact hole 150H is formed by selectively removing a portion of the first protective film 150a located over a portion of the drain electrode 140B, a portion of the second protective film 150b located over the portion of the drain electrode 140B and a portion of the insulating film 150c located over the portion of the drain electrode 140B to exposes the portion of the drain electrode 140b. A slit-shaped pixel electrode 170 is formed on the insulating film 150c. The pixel electrode 170 is connected through the drain contact hole 150H to the drain electrode 140b. The common electrode 160 overlaps the pixel electrode 170 via the insulating film 150c to form fringe field switching (FFS).

Although not illustrated, the color filter substrate includes color filter formed in respective pixel regions of an upper substrate, black matrixes in regions provided between respective sub-pixels and regions corresponding to the thin film transistors to prevent light leakage, and an over coat layer covering the entire surface of the upper substrate including the color filters and the black matrixes. In addition, the liquid crystal layer disposed between the thin film transistor substrate and the color filter substrate. Liquid crystal molecules of the liquid crystal layer are rotated by fringe field switching. According to a rotational level of the liquid crystal molecules, transmittance of light through the pixel region is changed and an image is thus formed.

In the flat panel display according to the second embodiment, the pixel electrode of a defective sub-pixel 1A is divided into first and second pixel electrode patterns 170a and 170b, and the first and second pixel electrode patterns 170a and 170b are connected through the first and second link patterns 200a and 200b to the pixel electrodes 170 of different normal sub-pixels, respectively.

Specifically, the first pixel electrode pattern 170a is connected through the first link pattern 200a to the pixel electrode 170 of the normal sub-pixel 1C which is disposed upstream of the defective sub-pixel 1A, and the second pixel electrode pattern 170b is connected through the second link pattern 200b to the pixel electrode 170 of the normal sub-pixel 1D which is disposed downstream of the defective sub-pixel 1A. In addition, in the thin film transistor of the defective sub-pixel 1A, a part of the drain electrode 140b is removed (not shown) in order to block a data signal. In FIG. 4b, "open" refers to a break (i.e., a cut) in the drain electrode of the defective sub-pixel as previously described above.

That is, the flat panel display according to the second embodiment of the present invention drives 1.5 sub-pixels using one thin film transistor. Specifically, although electric charges are distributed in the normal sub-pixel 1C and the defective sub-pixel including the first pixel electrode pattern 170a through one thin film transistor, as compared to frame and line inversion modes, the Z-inversion mode has sufficient charging time margin of the thin film transistors. Accordingly, deterioration in display quality of the sub-pixels can be prevented, although two sub-pixels are driven using one thin film transistor.

Further, the flat panel display according to the second embodiment of the present invention exhibits improved display quality of the sub-pixels, as compared to the flat panel display according to the first embodiment in which two sub-pixels are driven by one thin film transistor.

Hereinafter, a method for fabricating the flat panel display of the present invention will be described with reference to the annexed drawings.

FIGS. 5A to 5I are sectional views illustrating processes for fabricating the flat panel display according to the second embodiment of the present invention.

Figure 5A:
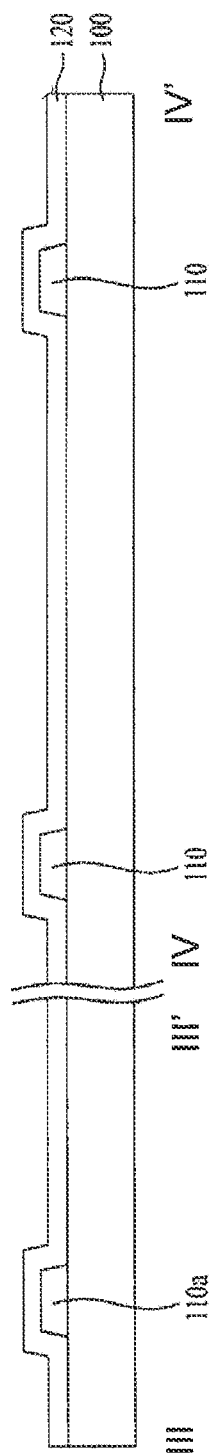
FIGS. 5A to 5I are sectional views illustrating processes associated with a method for fabricating the flat panel display according to the second embodiment.

As shown in FIG. 5A, a plurality of gate lines 110 and a gate electrode 110a are formed on a lower substrate 100. A gate insulating film 120 is formed over the entire surface of the lower substrate 100 including the gate line 110 and the gate electrode 110a.

Figure 5B:
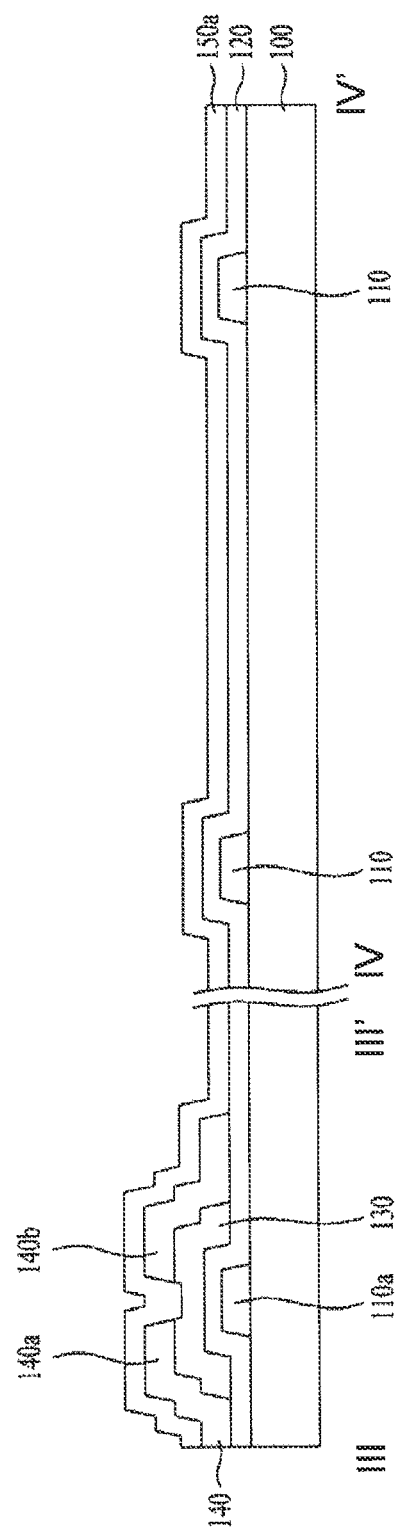

As shown in FIG. 5B, a semiconductor layer 130 including an active layer and an ohmic contact layer is formed on the gate insulating film 120 such that it overlaps the gate electrode 110a. The data lines 140 which intersect with the gate lines 110 via the gate insulating film 120 to define pixel regions, a source electrode 140a protruding from the data line 140, and a drain electrode 140b spaced from the source electrode 140a are formed on the semiconductor layer 130. In addition, the ohmic contact layer between the source and drain electrodes 140a and 140b is selectively removed to form a channel.

As a result, the thin film transistor TFT including the gate electrode 110a, the gate insulating film 120, the semiconductor layer 130, and the source and drain electrodes 140a and 140b is formed. Meanwhile, although formation of the data lines 140, the source and drain electrodes 140a and 140b, and the semiconductor layer 130 using different masks is illustrated in the drawings, these components may be simultaneously formed in order to reduce the number of masks. In addition, the first protective film 150a is formed over the gate insulating film 120 to cover the entire surface of the lower substrate 100 including the thin film transistor and the data lines 140.

Figure 5C:
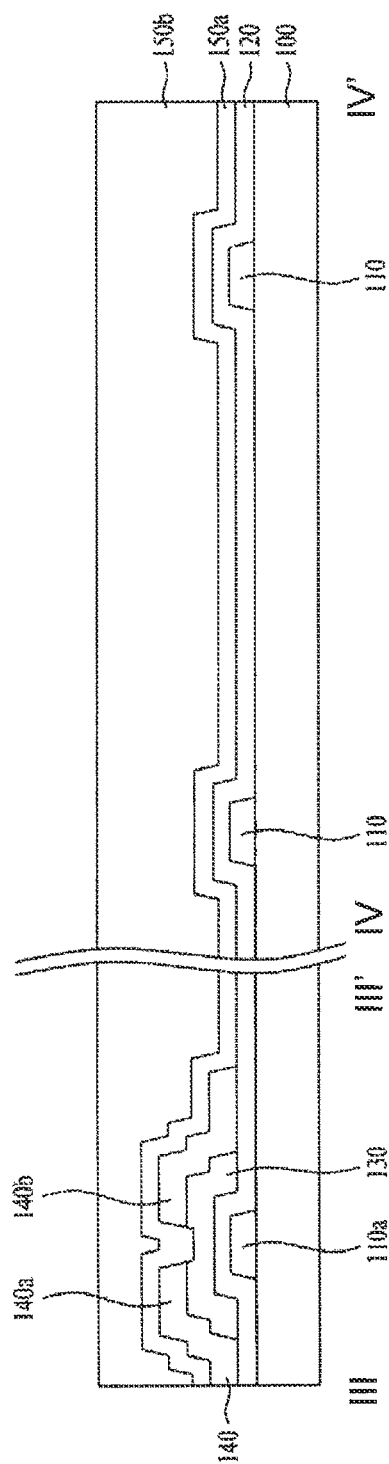
Figure 5D:
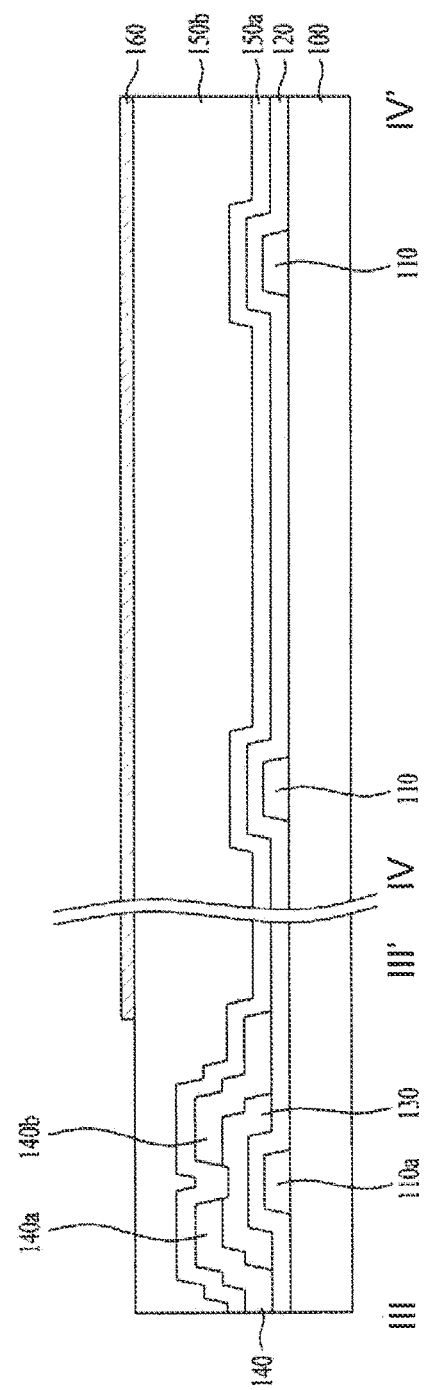

As shown in FIG. 5C, a second protective film 150b is formed on the first protective film 150a. As shown in FIG. 5D, a common electrode 160 having a single electrode shape is formed on the second protective film 150b. The common electrode 160 is formed of a transparent conductive material such as tin oxide (TO), indium tin oxide (ITO), indium zinc oxide (IZO), or indium tin zinc oxide (ITZO). The common electrode 160 is formed over the length of the lower substrate 100 such that it has an opening only in a region corresponding to the thin film transistor such as the region above the thin film transistor.

Figure 5E:
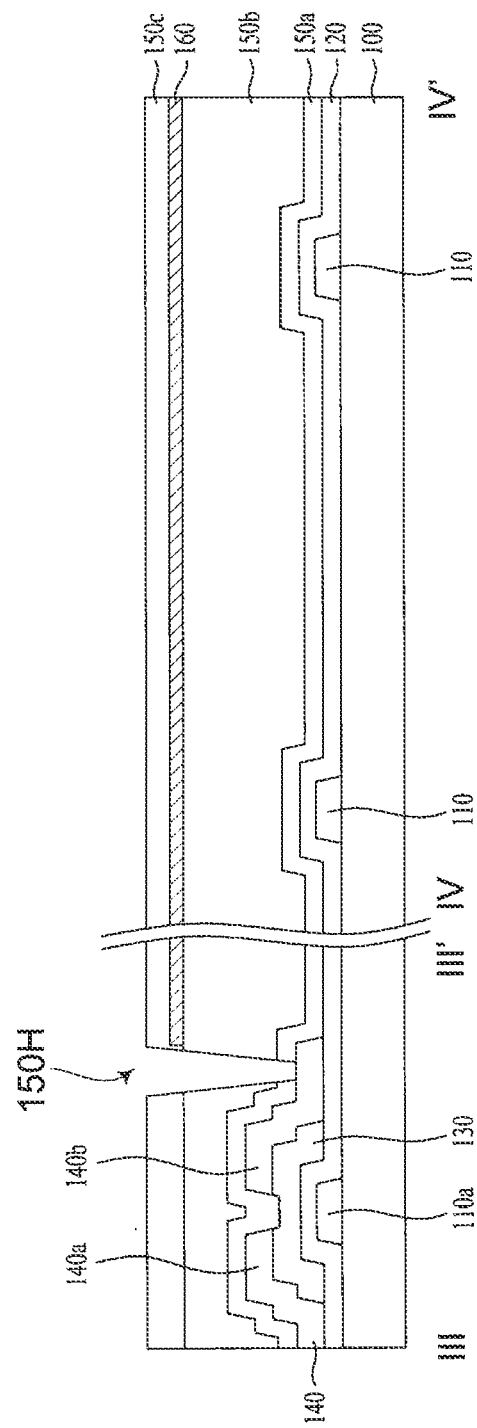
Figure 5F:
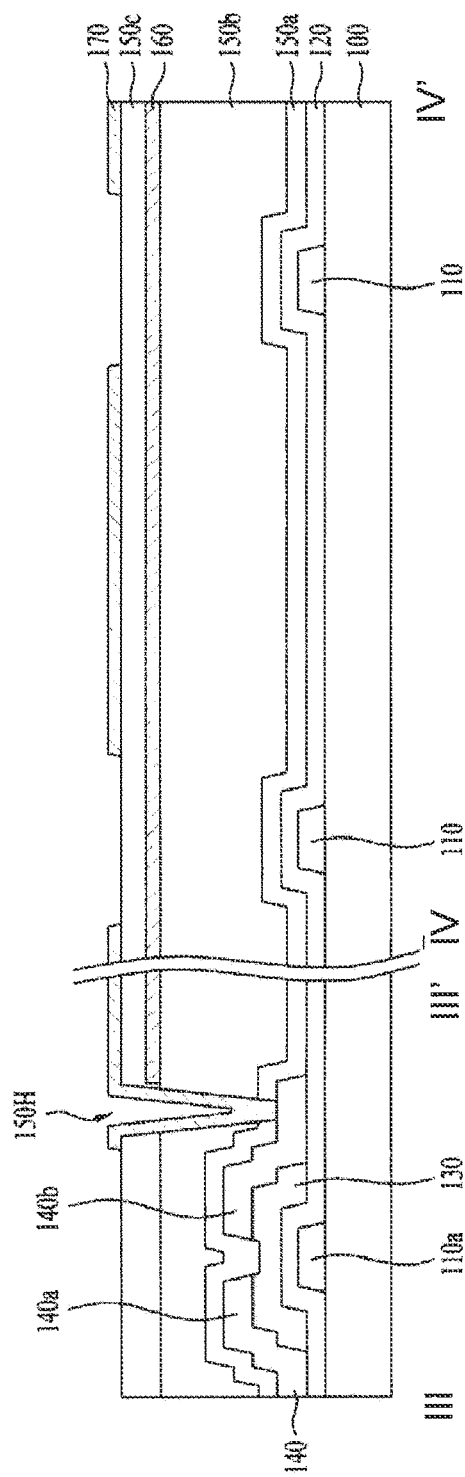

As shown in FIG. 5E, an insulating film 150c is formed such that it covers the entire surface of the common electrode 160. A drain contact hole 150H is formed in the first and second protective films 150a and 150b and the insulating film 150c by selectively removing a portion of the first protective film 150a, a portion of the second protective film 150b, and a portion of the insulating film 150c above a portion of the drain electrode 140B to expose the portion of the drain electrode 140b. As shown in FIG. 5F, a plurality of slit-shaped pixel electrodes 170 are formed in each pixel region on the insulating film 150c. The plurality of slit-shaped pixel electrodes 170 are formed of the transparent conductive material. Each pixel electrode 170 is connected to the drain electrode 140b through the drain contact hole 150H.

In order to check whether the sub-pixels are normally driven (i.e., functioning correctly), a test signal is applied to the sub-pixels and the sub-pixels are checked to determine whether the sub-pixels are functioning correctly.

Figure 5G:
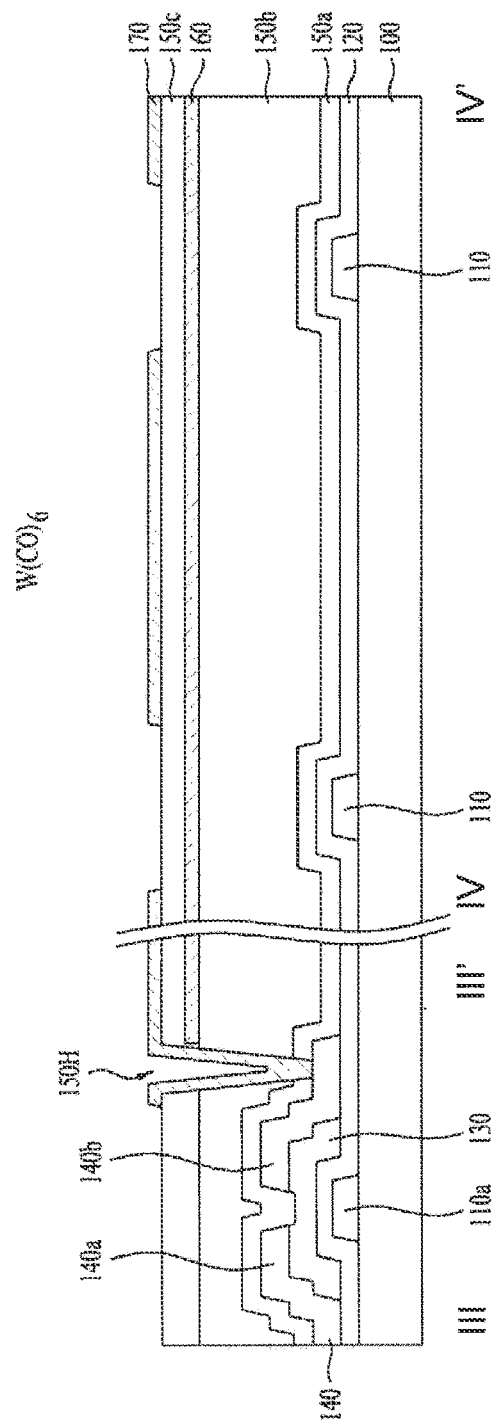

After checking the sub-pixels, if the defective sub-pixel is identified, as shown in FIG. 5G, a gas atmosphere having a predetermined component is created. In one embodiment, the gas having a predetermined component is tungsten hexacarbonyl (W(CO)6).

Figure 5H:
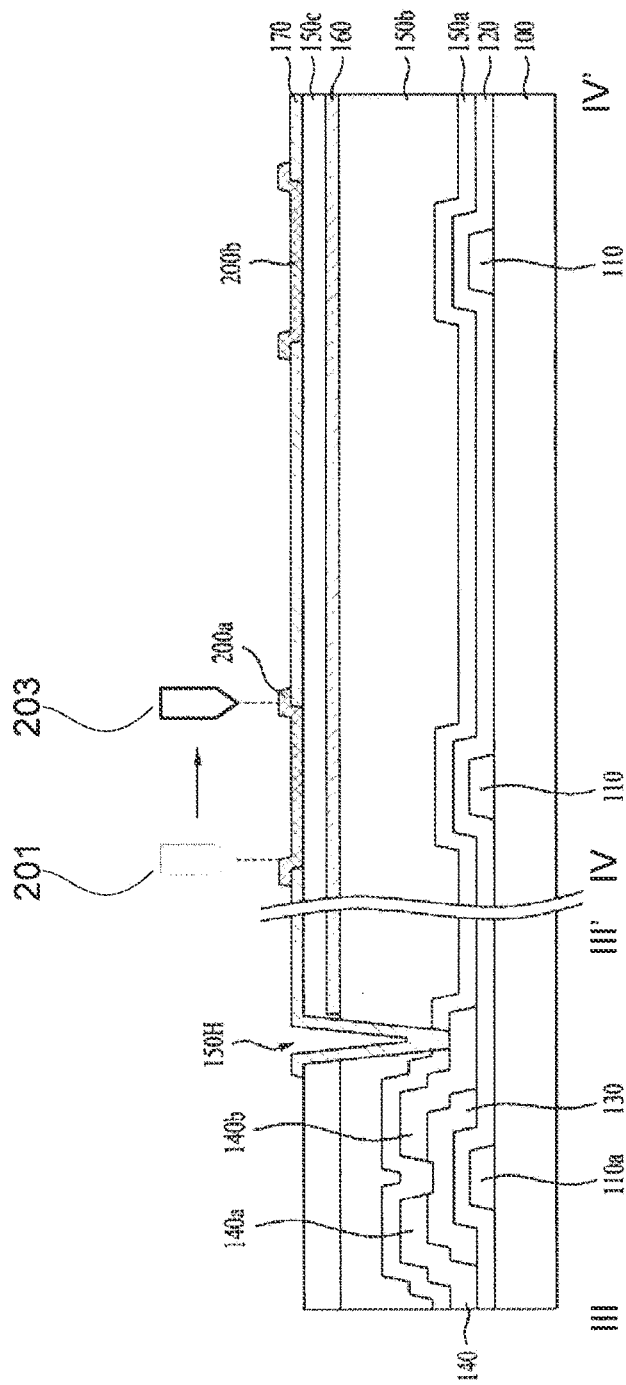

As shown in FIG. 5H, a laser is irradiated to the pixel electrode 170 of the defective sub-pixel under a tungsten hexacarbonyl (W(CO)6) atmosphere at a first position 201. In addition, when the laser is shifted to a second position 203 corresponding to the pixel electrode 170 of the defective sub-pixel, W(CO)6 reacts with the laser to decompose W(CO)6 and separate tungsten (W) from W(CO)6. In addition, the separated tungsten (W) is deposited along the laser-irradiated region and a link pattern 200a to connect the pixel electrode 170 of the defective sub-pixel to the pixel electrode 170 of the normal sub-pixel is formed. The laser is similarly shifted across the pixel electrode of the other normal sub-pixel adjacent to the defective sub-pixel to form the link pattern 200B.

In particular, the flat panel display according to the second embodiment of the present invention includes first and second link patterns 200a and 200b to connect a pixel electrode of the defective sub-pixel to pixel electrodes of the normal sub-pixels which are disposed upstream and downstream of the pixel electrode of the defective sub-pixel.

Figure 5I:
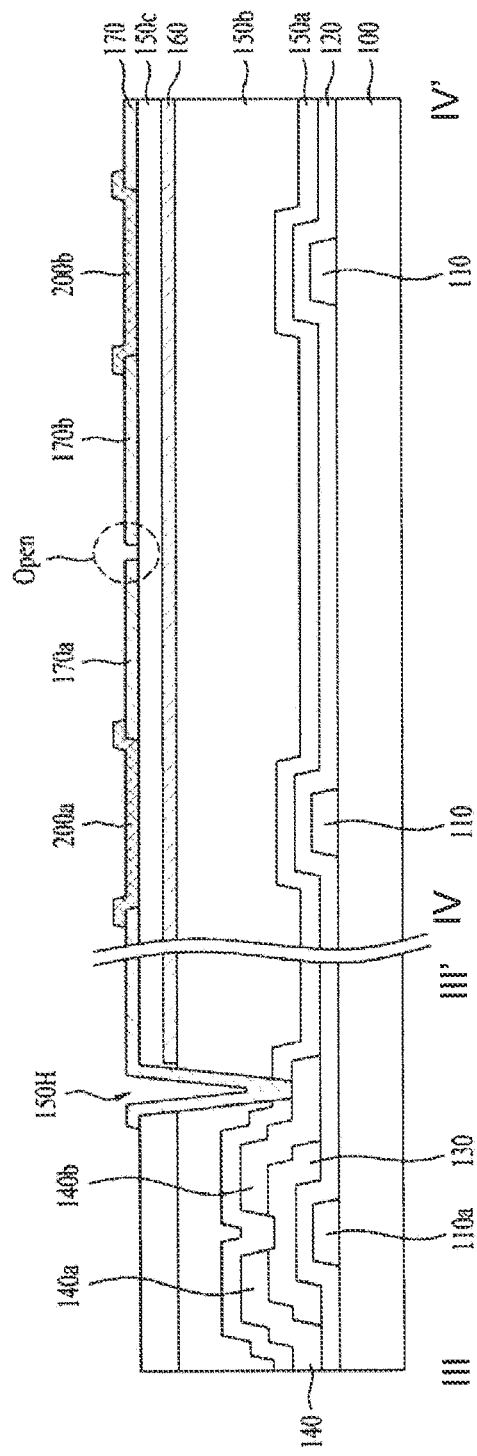

As shown in FIG. 5I, a part of a drain electrode 140b in the thin film transistor of the defective sub-pixel is removed (not shown) in order to block a data signal. At this time, the gate insulating film 120 corresponding to a region, where the drain electrode 140b is removed, is also removed to expose the top surface of the lower substrate 100. In FIG. 5I, "open" refers to a break (i.e., a cut) in the drain electrode of the defective sub-pixel as previously described above.

As described above, the pixel electrode of the defective sub-pixel is connected to two pixel electrodes of the normal sub-pixels disposed upstream and downstream of the defective sub-pixel. Also, the pixel electrode 170 of the defective sub-pixel is divided into the first and second pixel electrode patterns 170a and 170b. At this time, the first pixel electrode pattern 170a is connected through the first link pattern 200a to the pixel electrode 170 of the normal sub-pixel disposed upstream of the defective sub-pixel, and the second pixel electrode pattern 170b is connected through the second link pattern 200b to the pixel electrode 170 of the normal sub-pixel disposed downstream of the defective sub-pixel.

In the drawing, after forming the first and second link patterns 200a and 200b, the open of the drain electrode of the defective sub-pixel, and the division of the pixel electrode into the first and second pixel electrode patterns 170a and 170b are illustrated. After the open of the drain electrode 140b of the defective sub-pixel and division of the pixel electrode into the first and second pixel electrode patterns 170a and 170b are formed, the first and second link patterns 200a and 200b may be formed.

As described above, the flat panel display of the present invention can repair a defective sub-pixel by connecting the defective sub-pixel to the normal sub-pixel adjacent thereto and driving the defective sub-pixel using the thin film transistor of the normal sub-pixel. In this case, the flat panel display is driven in a Z-inversion mode and the thin film transistor of the normal sub-pixel connected to the defective sub-pixel can thus secure a sufficient charging time. Accordingly, the flat panel display can prevent deterioration in display quality of repaired defective sub-pixels and of the sub-pixels connected thereto.

Further, the flat panel display of the present invention has a high resolution in which each sub-pixel is driven in a fringe field switching mode, thus preventing defective sub-pixels from being readily visible, although the normal sub-pixel and the defective sub-pixel are connected to each other and are simultaneously driven.

The flat panel display of the present invention and a method for fabricating the same have the following advantages.

First, defective sub-pixels can be driven using the thin film transistor of the normal sub-pixel by connecting the pixel electrode of the defective sub-pixel to the pixel electrode of the normal sub-pixel adjacent to the defective sub-pixel.

Second, the thin film transistor of the normal sub-pixel connected to the defective sub-pixel can secure a sufficient charging time by driving the flat panel display in a Z-inversion mode. Accordingly, deterioration in display quality of repaired defective sub-pixels and normal sub-pixels connected to the defective sub-pixels can be prevented.

Third, the sub-pixels are driven in a fringe field switching (FFS) mode. Accordingly, the flat panel display driven in the FFS mode has a small sub-pixel size and thus high resolution, as compared to flat panel displays driven in a twisted nematic (TN) mode or an in-plane switching (IPS) mode. As a result, although the normal sub-pixel and the defective sub-pixel are connected to each other and are simultaneously driven, they are not readily seen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A flat panel display comprising:
   a display panel including a plurality of sub-pixels comprising a defective sub-pixel, a first non-defective sub-pixel that is vertically adjacent to the defective sub-pixel, and a second non-defective sub-pixel that is vertically adjacent to the defective sub-pixel, the plurality of sub-pixels defined by intersections of a plurality of gate lines and a plurality of data lines, each sub-pixel including a thin film transistor and a pixel electrode electrically connected to a drain electrode of the thin film transistor, and wherein a pixel electrode of the defective sub-pixel includes a break in the pixel electrode that divides the pixel electrode into a first pixel electrode pattern and a second pixel electrode pattern and the break electrically disconnecting the first pixel electrode pattern and the second pixel electrode pattern from each other; and
   a first link pattern comprising a first end and a second end, the first end of the first link pattern connected to the first pixel electrode pattern of the defective sub-pixel, and the second end of the first link pattern connected to a pixel electrode of the first non-defective sub-pixel that is vertically adjacent to the defective sub-pixel, the first pixel electrode pattern of the defective sub-pixel electrically connected to a drain electrode of a first thin film transistor included in the first non-defective sub-pixel via the first link pattern;
   a second link pattern comprising a first end and a second end, the first end of the second link pattern connected to the second pixel electrode pattern of the defective sub-pixel, and the second end of the second link pattern connected to a pixel electrode of the second non-defective sub-pixel that is vertically adjacent to the defective sub-pixel, the second pixel electrode pattern of the defective sub-pixel electrically connected to a drain electrode of a second thin film transistor included in the second non-defective sub-pixel via the second link pattern.

2. The flat panel display of claim 1, wherein the gate lines include first gate lines alternating with second gate lines, and the first thin-film transistor connected to one of the first gate lines is connected to a data line left of the first thin-film transistor, and wherein the second thin-film transistor connected to one of the second side gate lines is connected to a data line right of the second thin-film transistor.

3. The flat panel display according to claim 1, wherein the first link pattern overlaps a gate line between the defective sub-pixel and the adjacent first non-defective sub-pixel, the first link pattern insulated from the gate line.

4. The flat panel display according to claim 1, wherein the defective sub-pixel, the first non-defective sub-pixel, and the second non-defective sub-pixel emit a same color of light.

5. The flat panel display according to claim 1, wherein the display panel comprises:
   a lower substrate;
   the plurality of gate lines and the plurality of data lines intersecting each other via a gate insulating film to define the sub-pixels on the lower substrate;
   a first protective film covering the thin film transistor of each sub-pixel;
   a second protective film covering the thin film transistor of each sub-pixel;
   a common electrode formed on the second protective film;
   an insulating film formed on the common electrode;
   a drain contact hole exposing a drain electrode of the thin film transistor by selectively removing a portion of the first protective film, a portion of the second protective film, and a portion of the insulating film; and
   a pixel electrode connected to the thin film transistor through the drain contact hole, the pixel electrode overlapping the common electrode via the insulating film to form fringe field switching with the common electrode.

6. The flat panel display according to claim 5, wherein a part of the drain electrode of the defective sub-pixel is removed to separate the pixel electrode of the defective sub-pixel from the thin film transistor of the defective sub-pixel.

7. A method for fabricating a flat panel display comprising:
   forming a display panel comprising a plurality of sub-pixels comprising a defective sub-pixel, a first non-defective sub-pixel that is vertically adjacent to the defective sub-pixel, and a second non-defective sub-pixel that is vertically adjacent to the defective sub-pixel, the plurality of sub-pixels defined by a plurality of gate lines and a plurality of data lines, wherein each sub-pixel comprises a thin film transistor, a pixel electrode electrically connected to a drain electrode of the thin film transistor, and a common electrode overlapping the pixel electrode via an insulating film to form fringe field switching, and wherein a pixel electrode of the defective sub-pixel includes a break in the pixel electrode that divides the pixel electrode into a first pixel electrode pattern and a second pixel electrode pattern and the break electrically disconnecting the first pixel electrode pattern and the second pixel electrode pattern from each other;
   identifying a defective sub-pixel from among the plurality of sub-pixels; and connecting a first end of a first link pattern to the first pixel electrode pattern of the defective sub-pixel and connecting a second end of the first link pattern to a pixel electrode of the first non-defective sub-pixel that is vertically adjacent to the defective sub-pixel, the first pixel electrode pattern of the defective sub-pixel electrically connected to a drain electrode of a first thin film transistor included in the first non-defective sub-pixel via the first link pattern; and connecting a first end of a second link pattern to the second pixel electrode pattern of the defective sub-pixel and connecting a second end of the second link pattern to a pixel electrode of the second non-defective sub-pixel that is vertically adjacent to the defective sub-pixel, the first pixel electrode pattern of the defective sub-pixel electrically connected to a drain electrode of a first thin film transistor included in the first non-defective sub-pixel via the first link pattern.

8. The method of claim 7, wherein the gate lines include first gate lines alternating with second gate lines, and the first thin-film transistor connected to one of the first gate lines is connected to a data line left of the first thin-film transistor, and wherein the second thin-film transistor connected to one of the second side gate lines is connected to a data line right of the second thin-film transistor, to drive the display panel in a Z-inversion mode.

9. The method according to claim 7, wherein the first link pattern overlaps a gate line between the defective sub-pixel and the adjacent first non-defective sub-pixel, the first link pattern insulated from the gate line.

10. The method of claim 7, wherein connecting the first end of the first link pattern to the first pixel electrode pattern of the defective sub-pixel and connecting the second end of the first link pattern to the pixel electrode of the first non-defective sub-pixel comprises:

irradiating a laser to the first pixel electrode of the defective sub-pixel under a gas atmosphere; and shifting the laser to the pixel electrode of the first non-defective sub-pixel.

11. The method according to claim 10, wherein the gas atmosphere is a tungsten hexacarbonyl ($W(CO)_6$) atmosphere.

12. The method according to claim 10, wherein the link pattern is formed by depositing material separated from the gas atmosphere along a laser-irradiated region.

13. The method according to claim 12, wherein the material deposited along the laser-irradiated region is tungsten (W).

14. The method according to claim 7, further comprising:
irradiating a laser at a first end of the pixel electrode of the defective sub-pixel under an atmosphere;
shifting the laser to the pixel electrode of the first non-defective sub-pixel vertically adjacent to the defective sub-pixel to form the first link pattern;
irradiating the laser at a second end of the pixel electrode of the defective sub-pixel under the atmosphere; and
shifting the laser to the pixel electrode of the second non-defective sub-pixel vertically adjacent to the defective sub-pixel to form the second link pattern.

15. The method according to claim 14, wherein the atmosphere is a tungsten hexacarbonyl ($W(CO)_6$) atmosphere and the method further comprising:
depositing tungsten (W) separated from the tungsten hexacarbonyl $W(CO)_6$ atmosphere along a laser-irradiated region.

16. The method according to claim 7, wherein the defective sub-pixel and the sub-pixel emit the same color of light.

17. The flat panel display of claim 1, wherein the thin film transistor included in each sub-pixel includes a drain electrode, a source electrode, and a gate electrode, wherein the gate electrode is distinct form the pixel electrode electrically connected to the thin film transistor.

* * * * *